Dec. 25, 1923.
L. CASALE
1,478,549
CATALYTIC APPARATUS FOR THE SYNTHESIS OF AMMONIA
Filed March 31, 1921
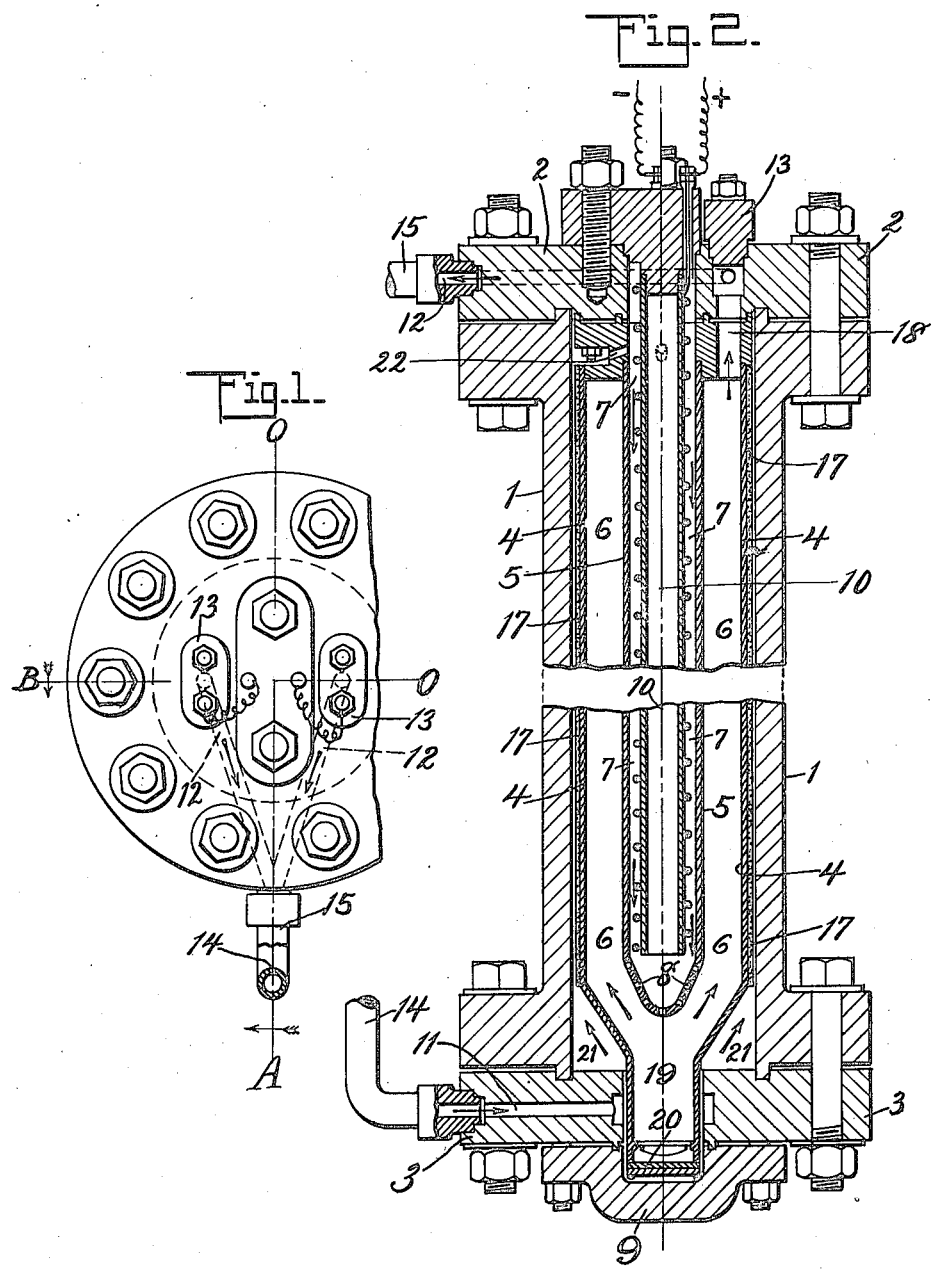
INVENTOR:
Luigi Casale
BY J. H. Gibbs
ATTORNEY.

Patented Dec. 25, 1923.

1,478,549

UNITED STATES PATENT OFFICE.

LUIGI CASALE, OF ROME, ITALY, ASSIGNOR, BY DIRECT AND MESNE ASSIGNMENTS, TO CASALE AMMONIA COMPANY, OF LUGANO, SWITZERLAND

CATALYTIC APPARATUS FOR THE SYNTHESIS OF AMMONIA.

Application filed March 31, 1921. Serial No. 457,211.

*To all whom it may concern:*

Be it known that I, LUIGI CASALE, a subject of the King of Italy, and residing at Rome, Italy, have invented certain new and useful Improvements in a Catalytic Apparatus for the Synthesis of Ammonia, of which the following is a specification.

In the Italian application filed on September 21, 1920, a catalytic apparatus for the synthesis of ammonia was described which constituted an important improvement over other well known devices. One of the principal features of the apparatus was to have the electrical resistance for the heating in its centre and the catalytic mass between the electrical resistance and the external tube which withstands the pressure. In this way the external tube is subjected to a very indirect heating thru the catalytic mass especially when a layer of thermic insulation is placed between the catalytic mass and the external wall. The temperature of this external wall always remains far below that at which the compressed hydrogen would deteriorate the steel and render it unserviceable.

To the apparatus a heat recovering appliance is joined, in which the outgoing hot gases yield their thermic energy to the incoming gases and it is advantageous to have the most efficacious heat recovering appliance so as to require the least possible quantity of energy for heating the gases to the temperature required for the catalysis. It is true that the formation of ammonia is accompanied by the generation of heat, but it is difficult to make this supply the unavoidable losses of heat recovering appliances and also the substantial losses due to the radiation of the apparatus.

As, however, the pressure, at which the synthesis of ammonia takes place, gradually increases from the ordinary pressure of about 200 to 250 atmospheres to the exceptional pressures of about 1000 atmospheres the production of heat in a determined catalytic space rapidly increases owing to the greater percentage of mixture converted to ammonia by contact with the catalytic mass, and owing also to the smaller volume occupied by the mixture of the reacting gases.

When the pressure increases there is therefore no longer the urgent necessity of a complete recovery of the thermic energy possessed by the outgoing gases and even a cooling of the catalytic mass is necessary to avoid excessive self-heating. Moreover when the density of the gases owing to the increasing pressure augments, their thermal conduction also augments and the efficiency of the layer of insulating material placed between the tube containing the catalytic mass and the external wall diminishes. It is then necessary on account of this greater permeability added to the danger of excessive self-heating of the catalytic mass, to protect in a better way the pressure withstanding external wall against the influence of the internal temperature of the apparatus when the work is accomplished at very high pressures.

The applicant has thus modified the apparatus above named in such a manner that the work may be done under the highest pressures without any danger at all by securing for the external wall a comparatively low temperature, and moderating at the same time the reaction in the catalytic space so that cases of excessive self heating are avoided.

This result was reached by directing the inflowing gases between the tube containing the catalytic mass and the external wall, the gases having the surrounding temperature of a slightly higher temperature when a part of the thermic energy possessed by the outgoing gases is recovered, but in any case the said temperature will always remain far below that at which the compressed hydrogen would deteriorate the steel.

The gases, while protecting the external wall at the same time absorb heat from the catalytic mass and keep the reaction between suitable limits.

In the original apparatus the following improvements constituting the subject matter of the present application have been introduced.

A tube with thick walls to resist the pressure of the gases.

To internal concentric tubes to contain in their annular space the catalytic mass and in their central space the resistance for heating.

Moreover in the improved apparatus the tube containing the catalytic mass besides being independent from the pressure resisting tube and from the resistance is constructed in such a way as to allow the said catalytic mass to be replaced through openings placed in the strong steel plates closing the ends of the external pressure sustaining tube containing the catalytic mass, so that difficult operations of dismantling and replacing important parts are avoided.

With reference to the accompanying drawing Fig. 1 shows a plan view while Fig. 2 is a section taken on the lines O—A and O—B of the apparatus which comprises:

An external tube with thick walls (1) closed at the ends by strong plates (2) (3).

Two iron concentric tubes with thin walls (4) (5) one inside the other forming a hollow cylinder containing in the annular space (6) the catalytic mass and in the central space (7) the resistance for the heating (10). The lower part of the internal tube is closed in order to separate the space for the resistance from the catalytic space, and is provided with holes (8) for the passage of the gases from the space (7) to the space (6).

The walls of tube (4) are tapering in their lower part (19) and extend through the plate (3). The opening of the cylinder contracted in such a way is closed by a thin disk (20) and made gas tight by a strong steel plate (9), as shown in the drawing. The cylinder containing the catalytic mass is externally covered with a layer of insulating material (17), a free space being left between the cylinder and the wall for the passage of the gases.

A hole (11) through the plate (3) discharges into the external space (21), while the holes (12) joining into one hole in the plate (2) connect through the openings (18) the catalytic space (6) with the external part of the apparatus. The gases pass through the tube (14) and the hole (11) into the space (21) and flow between the external wall and the insulating layer surrounding the wall (4), then pass into the internal space (7) through openings (22) and passing along the resistance (10) come to the lower end where through the small holes (8) they enter the catalytic space (6), and flow along this whole space and through the holes (18) (12), and finally discharge into the external tube (15).

This arrangement protects the external tube much better against the danger of excessive heating, for the reason that while in the original type the external tube was separated from the tube containing the catalytic mass by a layer of insulating material, in the improved type according to the present application it is separated from the insulating layer by a current of gas with a temperature far below that which would cause the steel to be deteriorated by the hydrogen. This comparatively cool current of gas has the double purpose of keeping the external tube in good condition and of moderating the reaction taking place in the space (6) by keeping it between limits suitable for a good yield by the apparatus.

Instead of admitting the gaseous mixture through the plate (3) it can be introduced through plate (2) after dividing the empty space between the insulating material and the external wall into two parts and arranging a diaphragm in such a manner that the incoming gas first descends between the diaphragm and the external wall, and then ascends again between the diaphragm and the insulating layer, to then descend again through the central space (7) as far as the holes (8). This construction has the advantage of making the temperature of the external wall even more independent of the internal temperature. In these particular cases it may be convenient not to use the thermic insulating material.

The improved apparatus offers a further advantage in that the catalytic mass may be changed without extracting the cylinder containing it from the pressure withstanding tube, it being sufficient to remove the closing plate (9) and the disc (20) to allow the catalytic mass to be withdrawn and then after restoring the plate and the disc the catalytic mass may be admitted to the space (6) through the holes (18) closed by the plugs (13).

What I claim is:

1. In an apparatus for the synthesis of ammonia, a pressure sustaining tube, closures for said tube, means in one closure for supplying the catalytic agent to said tube and means in the other closure for withdrawing the catalytic agent from said tube.

2. In an apparatus for the synthesis of ammonia, a pressure sustaining tube having a catalytic chamber therein, closures for said tube closing said chamber, gas supply and discharge connections for said chamber connected to said closures, means carried by one of said closures for heating the gas supplied to said chamber and means whereby the catalytic agent may be supplied to and discharged from said chamber independently of said gas connections and heating means.

3. In an apparatus for the synthesis of ammonia, a pressure sustaining tube having a catalytic chamber, closures for said tube closing said catalytic chamber, a gas supply for said chamber connected to one of said closures, a discharge for said chamber leading from the other of said closures and means whereby the catalytic agent may be supplied to and discharged from said chamber independently of said gas supply and discharge connections.

4. In an apparatus for the synthesis of ammonia, a pressure sustaining tube, plates closing said pressure sustaining tube, tubes carried by said plates forming catalytic and heating chambers, a heating element in said heating chamber carried by one of said plates and means carried by the other plate closing an end of said catalytic chamber.

5. In an apparatus for the synthesis of ammonia, a pressure sustaining tube, plates closing the ends of said pressure sustaining tube, tubes carried by said plates forming catalytic and heating chambers, an inlet passage for said catalytic chamber connected to one of said plates and a discharge passage for said catalytic chamber connected to the other of said plates.

6. In an apparatus for the synthesis of ammonia, a pressure sustaining tube, concentric tubes in said pressure sustaining tube forming a heating chamber and a surrounding catalytic chamber, said concentric tubes being so positioned in said pressure sustaining tube that the incoming gases insulate the pressure sustaining tube from the catalytic chamber and are simultaneously heated by the catalytic chamber and the heating element while in the heating chamber.

7. In an apparatus for the synthesis of ammonia, a pressure sustaining tube, a plurality of concentric tubes in said pressure sustaining tube forming a heating chamber and an annular catalytic chamber surrounding said heating chamber, said concentric tubes being so positioned in said pressure sustaining tube that the incoming gases surround the catalytic chamber.

8. In an apparatus for the synthesis of ammonia, a pressure sustaining tube having an annular catalytic chamber, a chamber surrounded by said catalytic chamber in which the incoming gases are heated and means for insulating the pressure sustaining tube from the catalytic chamber by the incoming gases.

9. In an apparatus for the synthesis of ammonia, a pressure sustaining tube, concentric tubes mounted in said pressure sustaining tube and forming catalytic and heating chambers and insulation surrounding the outer concentric tube, said tubes being so positioned and connected that the incoming gases surround said insulated tube in passing to the heating chamber.

10. In an apparatus for the synthesis of ammonia, a pressure sustaining tube, and an annular container forming a catalytic chamber mounted in said pressure sustaining tube, the gases supplied to said catalytic chamber contacting with the outer and inner surfaces of said container as they pass to said catalytic chamber.

11. In an apparatus for the synthesis of ammonia, a pressure sustaining tube and a container forming a catalytic chamber mounted in said pressure sustaining tube, said container being spaced from said pressure sustaining tube throughout its length to provide a passage for the gases supplied to said catalytic chamber in which the gases contact with said container and said tube simultaneously.

12. In an apparatus for the synthesis of ammonia, a pressure sustaining tube, an annular container forming a catalytic chamber mounted in said pressure sustaining tube and a heating element surrounded by said container, said pressure sustaining tube being insulated from said container by the gases supplied to said catalytic chamber.

13. In an apparatus for the synthesis of ammonia, a pressure sustaining tube and a container forming a catalytic chamber mounted in said pressure sustaining tube, said pressure sustaining tube being cooled by the gases brought into direct contact therewith before such gases are supplied to said catalytic chamber.

In testimony whereof I have hereunto signed my name in the presence of two witnesses.

LUIGI CASALE.

Witnesses:
  Di Toffa Giulio,
  L. Perrotta.